Nov. 7, 1967   R. C. COLLINS   3,351,046
POWER ROTATED ABRADING TOOL
Filed May 14, 1965

INVENTOR.
ROBERT C. COLLINS
BY
Lloyd

United States Patent Office 3,351,046
Patented Nov. 7, 1967

3,351,046
POWER ROTATED ABRADING TOOL
Robert C. Collins, 76 NE. 67th St.,
Miami, Fla. 33138
Filed May 14, 1965, Ser. No. 455,727
3 Claims. (Cl. 125—5)

ABSTRACT OF THE DISCLOSURE

A power driven tool having a plurality of rotatable abrading discs radially journalled in a multicup housing with the cutting edges of the discs extending therefrom coplanar with each other.

---

This invention relates in general to abrading devices and more particularly to a power driven abrading tool for abrading various surfaces when rotated by a conventional portable power drill.

The construction hereinafter described sets forth certain improvements in construction on the device described in my U.S. Patents Numbers 3,260,254, 3,263,665 and 3,263,666.

A principal object of the invention is the provision of an assembly of low cost stampings and machine screw parts, which drive five sets of abrading wheels for abrading substantially planar surfaces and driven by a coaxial spindle resiliently secured in the device, the construction of which inherently includes a cylindrical guard for chips and a non-damaging outer periphery free from projections.

These and other objects and advantages in one embodiment of the invention are described and shown in the following specification and drawing, in which.

Figure 1:
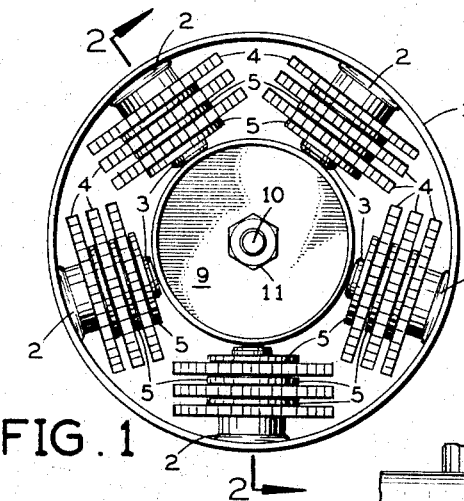
FIG. 1 is a bottom plan view of the tool.
Figures 2, 5:
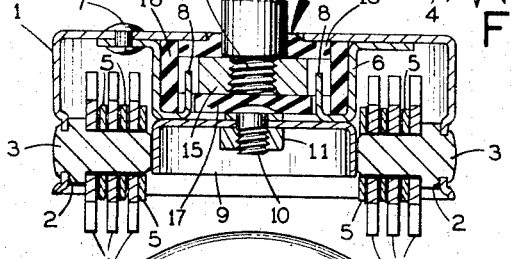
FIG. 2 is a cross sectional elevation taken through section line 2—2, FIG. 1.
FIG. 5 is a fragmentary side elevation of elements shown in FIGS. 1 and 2.

Referring to FIGS. 1 and 2, the abrading device comprises a cup shaped outer body or housing 1, formed from sheet metal of uniform thickness with five equispaced planar extrusions 2 in the cylindrical portion thereof and having a central hole in each one thereof. A radial inward extending shoulder stud 3 is riveted or swaged in each hole, which serves as an axle on which three toothed abrading discs 4 are journalled with washers 5 retaining the discs in spaced relation, as shown, with the outer edges of said disc in a common plane.

Figure 4:
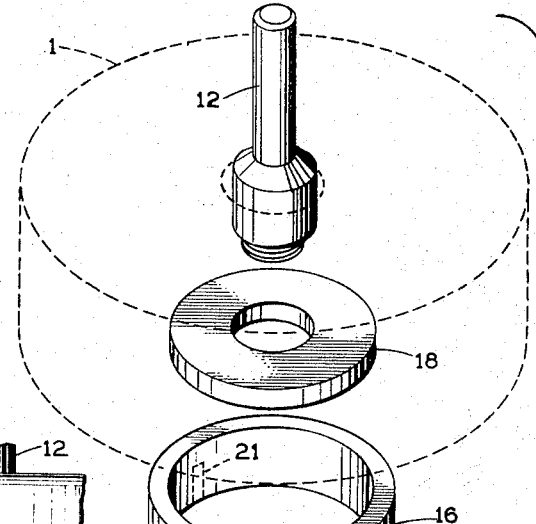
FIG. 4 is an enlarged perspective exploded view of the elements of the tool.
Figure 3:
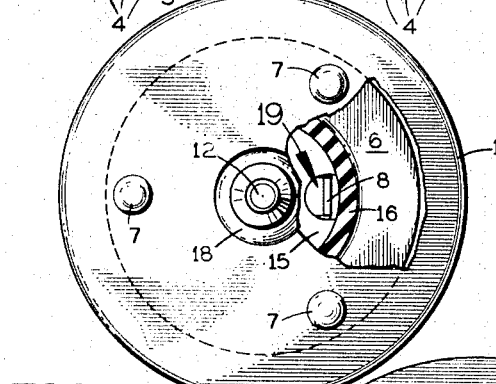
FIG. 3 is a top view of the tool shown in FIG. 1 with a portion thereof broken away.
Figure 6:
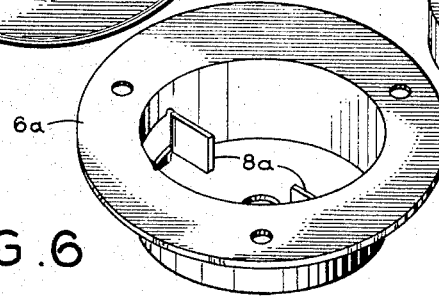
FIG. 6 is a perspective view of an alternate construction shown in FIG. 4.

Referring to FIGS. 2, 3, and 4, a flanged driven cup 6, formed from sheet metal of uniform thickness, is riveted against the inner surface of housing 1 coaxial therewith by three rivets 7. The cup has a pair of integral driven lugs 8 lanced upward from the bottom thereof, the use of which will be hereinafter described.

A third cup 9 is coaxially and removably retained against the outer side of cup 6 by a central bolt and nut 10 and 11, respectively, as shown in FIG. 2, with the cylindrical portion of cup 9 positioned to retain the discs and washers 5 in their position of rotation of studs 3, as shown.

A drive spindle 12, adapted to be retained in a power driven chuck, is centrally positioned through a central clearance hole 13 in housing 1 and the lower end 14 thereof is threaded into a metal drive disc 15 which is coaxially retained in cup 6 by a resilient tubular member 16, preferably made of rubber. The disc 15 is positioned between the parallel planar portions of housing 1 and cup 6 by resilient discs 17 and 18, respectively, under predetermined pressure. It is to be noted that discs 15 and 17 have a pair of opposite recesses 19 and 20, respectively, as shown, which are engaged by oppositely driven lugs 8, as illustrated in FIGS. 2 and 3.

It is now apparent that the spindle 12 is normally coaxial with the axis of housing 1 but the housing may be urged into limited universal angular positions with respect to the axis of spindle 12 by virtue of the resilience of cylindrical member 16 and discs 18 and 20 when rotation is applied to disc 15 from spindle 12 when the latter is driven and discs 5 are rotating against and abrading a surface.

It is to be noted that bolt 10 may be provided with a square underhead for engaging a central square hole in cup 6 or secured by welding, since nut 11 and cup 9 are intended to be removed to replace worn discs 4.

An alternate construction provides for a cup 6a having lugs 8a integral therewith and lanced from the cylindrical portion of the cup instead of the bottom surface, shown in FIG. 4. This construction will call for slots 21 in cylindrical member 16, as illustrated in dotted lines in FIG. 4.

It is now apparent that the resilient members 16, 17, and 18 may be an integral unit molded on disc 15 as a preferred alternate construction.

It is understood that certain other modifications in the construction, utilizing the features above described, are intended to come within the scope of the appended claims.

Having described my invention, I claim:

1. In an abrading tool of the character described a cup shaped body having a cylindrical wall and an aperture therethrough coaxial with the axis thereof, a plurality of coplanar equispaced axles secured in said wall extending inward in radial relation with the axes thereof normal to the said axis, a coupling cup coaxial with said axis secured in inverse relation to the inner side of said body and having an aperture therethrough coaxial with said axis, a predetermined plurality of abrading discs of like diameter journalled on each of said axles, a second cylindrical cup of uniform thickness with the upper end thereof positioned coaxial and adjacent said coupling cup and including a coaxial aperture therethrough with the outer periphery of the wall thereof positioned in close proximity with the inner ends of each of said axles for retaining said discs on their respective said axles, screw means positioned through said cups for securing the latter in coaxial relation with said body.

2. An abrading tool comprising a cup shaped body having a cylindrical wall and an aperture therethrough coaxial with the axis thereof, a plurality of coplanar equispaced axles secured in said wall extending inward in radial relation with the axes thereof normal to the said axis, a coupling cup coaxial with said axis secured in inverse relation to the inner side of said body including a pair of oppositely disposed inward extending driven lugs, a drive spindle adapted to be engaged and rotated by a power driven chuck means centrally extending through said aperture in spaced relation and terminating at one end in a drive disc in said cup, a cylindrical resilient coupling means retained in and against the inner surface of said coupling cup and engaged with said drive disc and said driven lugs for rotating said body with limited universal movement thereof with respect to said spindle when the latter is rotated, a predetermined plurality of abrading discs of like diameter journalled on each of said axles whereby the outer periphery of said discs will abrade a surface in contact therewith when said spindle is engaged and rotated by said chuck means.

3. The construction recited in claim 2 including a second cup having a cylindrical wall secured in coaxial inverse relation to said first mentioned coupling cup by screw means central of both said cups with the said wall thereof positioned for removably retaining said discs on each of said axles.

References Cited
UNITED STATES PATENTS

| | | | |
|---|---|---|---|
| 1,377,537 | 5/1921 | Wimmer. | |
| 1,498,224 | 6/1924 | Atwood | 125—5 |
| 1,503,102 | 7/1924 | Alsted | 51—209 |
| 1,581,699 | 4/1926 | Sturrock | 125—5 |
| 1,722,625 | 7/1929 | Cooper | 64—31 XR |
| 2,767,564 | 10/1956 | Green | 64—31 XR |
| 2,854,829 | 10/1958 | Porter | 51—209 XR |
| 3,040,485 | 6/1962 | Guilbert | 51—209 |

HAROLD D. WHITEHEAD, *Primary Examiner.*